United States Patent
Shanks et al.

(10) Patent No.: US 11,497,068 B2
(45) Date of Patent: Nov. 8, 2022

(54) ESTABLISHING A PRIVATE NETWORK USING MULTI-UPLINK CAPABLE NETWORK DEVICES

(71) Applicant: Cisco Technology, Inc., San Jose, CA (US)

(72) Inventors: Robert Tristan Shanks, San Francisco, CA (US); Jignesh Devji Patel, San Francisco, CA (US); Patrick Douglas Verkaik, San Francisco, CA (US); Selahattin Daghan Altas, San Francisco, CA (US); Joseph Morgan Aronow, Oceanside, CA (US); Justin Delegard, San Francisco, CA (US); Dylan Jason Koenig, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/193,571

(22) Filed: Mar. 5, 2021

(65) Prior Publication Data

US 2021/0195667 A1  Jun. 24, 2021

Related U.S. Application Data

(63) Continuation of application No. 17/176,779, filed on Feb. 16, 2021, which is a continuation of application
(Continued)

(51) Int. Cl.
*H04W 76/12* (2018.01)
*H04L 9/40* (2022.01)
(Continued)

(52) U.S. Cl.
CPC .......... *H04W 76/12* (2018.02); *H04L 61/256* (2013.01); *H04L 61/2592* (2013.01);
(Continued)

(58) Field of Classification Search
CPC ..... H04W 76/12; H04W 76/11; H04L 63/029; H04L 63/0272; H04L 61/2592; H04L 61/256; H04L 61/2514
See application file for complete search history.

(56) References Cited

U.S. PATENT DOCUMENTS 6,044,396 A    3/2000  Adams
6,289,419 B1   9/2001  Takahashi
(Continued)

FOREIGN PATENT DOCUMENTS

CN    1254059 C       4/2006
WO    2013007496 A1   1/2013
WO    2015092491      6/2015

OTHER PUBLICATIONS

"Aruba Central Support Page", Hewlett Packard Enterprise Development, 2021, 2 pages, https://help.central.arubanetworks.com/latest/documentation/online_help/content/gateways/cfg/overlay-orchestration/tunnel-orchestration.htm.

(Continued)

*Primary Examiner* — Yaotang Wang
(74) *Attorney, Agent, or Firm* — Polsinelli

(57) ABSTRACT

Various implementations disclosed herein include systems, methods and apparatuses of a first device, that obtain contact point information of a second device associated with the first device, as a peer device in a private network, where the contact point information of the second device includes one or more peer uplink identifiers and each respective peer uplink identifier corresponds to a respective peer device uplink of the second device. The systems, methods and
(Continued)

apparatuses establish a first private network data tunnel from a first uplink of the first device to the second device, using the contact point information of the second device, and a first uplink identifier associated with the first uplink, and establish a second private network data tunnel from a second uplink of the first device to the second device, using the contact point information of the second device, and a second uplink identifier associated with the second uplink.

30 Claims, 10 Drawing Sheets

Related U.S. Application Data

No. 17/110,484, filed on Dec. 3, 2020, which is a continuation of application No. 15/984,243, filed on May 18, 2018, now Pat. No. 10,917,926, which is a continuation of application No. 14/974,331, filed on Dec. 18, 2015, now Pat. No. 9,980,303.

(51) Int. Cl.
| | | |
|---|---|---|
| *H04W 76/11* | (2018.01) | |
| *H04L 61/256* | (2022.01) | |
| *H04L 61/2592* | (2022.01) | |
| *H04L 61/2517* | (2022.01) | |
| *H04L 61/2514* | (2022.01) | |

(52) U.S. Cl.
CPC ........ *H04L 63/029* (2013.01); *H04L 63/0272* (2013.01); *H04W 76/11* (2018.02); *H04L 61/2514* (2013.01); *H04L 61/2517* (2013.01)

(56) References Cited

U.S. PATENT DOCUMENTS

| | | |
|---|---|---|
| 6,535,607 B1 | 3/2003 | Chandersekaran et al. |
| 6,594,361 B1 | 7/2003 | Chaney et al. |
| 6,611,872 B1 | 8/2003 | McCanne |
| 6,675,225 B1 | 1/2004 | Genty et al. |
| 7,117,530 B1 | 10/2006 | Lin |
| 7,120,682 B1 | 10/2006 | Salama |
| 7,251,824 B2 | 7/2007 | Edwards et al. |
| 7,925,592 B1 | 4/2011 | Issa et al. |
| 7,995,573 B2 | 8/2011 | Danzeisen et al. |
| 8,023,504 B2 | 9/2011 | Shah et al. |
| 8,041,039 B2 | 10/2011 | Tajima et al. |
| 8,224,971 B1 | 7/2012 | Miller et al. |
| 8,515,079 B1 | 8/2013 | Asati et al. |
| 8,516,552 B2 | 8/2013 | Raleigh |
| 8,594,323 B2 | 11/2013 | Dondeti |
| 8,868,698 B2 | 10/2014 | Millington et al. |
| 8,879,739 B2 | 11/2014 | Bieber |
| 8,954,740 B1 | 2/2015 | Moscaritolo et al. |
| 8,959,333 B2 | 2/2015 | Falk et al. |
| 9,467,478 B1 | 10/2016 | Khan et al. |
| 9,659,170 B2 | 5/2017 | Chapman, III |
| 9,736,113 B1 | 8/2017 | Khan et al. |
| 9,980,303 B2 | 5/2018 | Shanks et al. |
| 10,277,558 B2 | 4/2019 | Khan et al. |
| 10,298,672 B2 | 5/2019 | Shanks et al. |
| 10,917,926 B2 | 2/2021 | Shanks et al. |
| 2003/0140142 A1 | 7/2003 | Marples et al. |
| 2004/0024702 A1 | 2/2004 | He |
| 2004/0088369 A1 | 5/2004 | Yeager et al. |
| 2004/0103205 A1 | 5/2004 | Larson et al. |
| 2004/0184603 A1 | 9/2004 | Pearson et al. |
| 2004/0203590 A1 | 10/2004 | Shteyn |
| 2005/0021610 A1 | 1/2005 | Bozionek et al. |
| 2005/0044356 A1 | 2/2005 | Srivastava et al. |
| 2005/0071280 A1 | 3/2005 | Irwin et al. |
| 2005/0094814 A1 | 5/2005 | Aihara |
| 2006/0015643 A1 | 1/2006 | Orava et al. |
| 2006/0088031 A1 | 4/2006 | Nalawade |
| 2006/0155721 A1 | 7/2006 | Grunwald et al. |
| 2006/0165233 A1 | 7/2006 | Nonaka et al. |
| 2006/0221830 A1 | 10/2006 | Hu |
| 2006/0233180 A1 | 10/2006 | Serghi et al. |
| 2006/0288209 A1 | 12/2006 | Vogler |
| 2007/0086431 A1 | 4/2007 | Abu-Amara |
| 2007/0104115 A1 | 5/2007 | Decasper et al. |
| 2007/0118885 A1 | 5/2007 | Elrod |
| 2007/0140110 A1 | 6/2007 | Kaler |
| 2007/0153782 A1 | 7/2007 | Fletcher et al. |
| 2007/0185814 A1 | 8/2007 | Boccon-Gibod et al. |
| 2007/0230688 A1 | 10/2007 | Tajima et al. |
| 2007/0248232 A1 | 10/2007 | Driscoll et al. |
| 2007/0299954 A1 | 12/2007 | Fatula |
| 2008/0013738 A1 | 1/2008 | Tajima et al. |
| 2008/0080716 A1 | 4/2008 | McAlister et al. |
| 2008/0130902 A1 | 6/2008 | Foo Kune et al. |
| 2008/0147820 A1 | 6/2008 | Maeda et al. |
| 2008/0273704 A1 | 11/2008 | Norrman et al. |
| 2009/0193253 A1 | 7/2009 | Falk et al. |
| 2009/0216910 A1 | 8/2009 | Duchesneau |
| 2009/0220080 A1 | 8/2009 | Herne et al. |
| 2009/0250988 A1 | 10/2009 | Catanzarite et al. |
| 2009/0296924 A1 | 12/2009 | Oksman et al. |
| 2010/0008292 A1* | 1/2010 | Ludwig ................ H04L 45/302 370/328 |
| 2010/0014677 A1 | 1/2010 | Sato et al. |
| 2010/0058082 A1 | 3/2010 | Locker et al. |
| 2010/0064008 A1 | 3/2010 | Yan et al. |
| 2010/0098088 A1 | 4/2010 | Hirota |
| 2010/0122084 A1 | 5/2010 | Liu |
| 2010/0169563 A1 | 7/2010 | Horner |
| 2010/0281251 A1 | 11/2010 | Arauz Rosado |
| 2010/0325423 A1 | 12/2010 | Etchegoyen |
| 2011/0010553 A1 | 1/2011 | Cahn |
| 2011/0064222 A1 | 3/2011 | Wiseman |
| 2011/0075674 A1 | 3/2011 | Li et al. |
| 2011/0110377 A1 | 5/2011 | Alkhatib et al. |
| 2011/0164750 A1 | 7/2011 | Maas et al. |
| 2011/0296510 A1 | 12/2011 | Hatlelid et al. |
| 2012/0051221 A1 | 3/2012 | Bui et al. |
| 2012/0092986 A1 | 4/2012 | Chen |
| 2012/0134361 A1 | 5/2012 | Wong et al. |
| 2012/0180122 A1 | 7/2012 | Yan et al. |
| 2012/0266209 A1 | 10/2012 | Gooding et al. |
| 2012/0284370 A1 | 11/2012 | Hierro |
| 2012/0290830 A1 | 11/2012 | Resch et al. |
| 2013/0034094 A1 | 2/2013 | Cardona et al. |
| 2013/0051559 A1 | 2/2013 | Baba |
| 2013/0121142 A1 | 5/2013 | Bai et al. |
| 2013/0163446 A1 | 6/2013 | Kruger et al. |
| 2013/0182712 A1 | 7/2013 | Aguayo et al. |
| 2013/0201909 A1 | 8/2013 | Bosch et al. |
| 2013/0223444 A1 | 8/2013 | Liljenstolpe et al. |
| 2013/0251154 A1 | 9/2013 | Tanizawa et al. |
| 2013/0266007 A1 | 10/2013 | Kumbhare et al. |
| 2013/0306276 A1 | 11/2013 | Duchesneau |
| 2013/0329725 A1 | 12/2013 | Nakil et al. |
| 2013/0335582 A1 | 12/2013 | Itasaki et al. |
| 2014/0003425 A1 | 1/2014 | Zhao et al. |
| 2014/0079059 A1 | 3/2014 | Amir et al. |
| 2014/0153457 A1 | 6/2014 | Liu |
| 2014/0153572 A1 | 6/2014 | Hampel et al. |
| 2014/0189363 A1 | 7/2014 | Thomas et al. |
| 2014/0223520 A1 | 8/2014 | Gafni |
| 2014/0294018 A1 | 10/2014 | Sung et al. |
| 2014/0297438 A1 | 10/2014 | Dua |
| 2014/0331050 A1 | 11/2014 | Armstrong et al. |
| 2014/0380039 A1 | 12/2014 | Larson et al. |
| 2015/0006737 A1 | 1/2015 | Chen et al. |
| 2015/0033298 A1 | 1/2015 | Martini |
| 2015/0092603 A1 | 4/2015 | Aguayo et al. |
| 2015/0103839 A1 | 4/2015 | Chandrashekhar et al. |
| 2015/0106620 A1 | 4/2015 | Cabrera et al. |
| 2015/0127797 A1 | 5/2015 | Attar et al. |
| 2015/0229490 A1 | 8/2015 | Brandstatter |
| 2015/0256521 A1 | 9/2015 | Cummings et al. |
| 2016/0036785 A1 | 2/2016 | Ambroz et al. |

(56) References Cited

U.S. PATENT DOCUMENTS

| | | |
|---|---|---|
| 2016/0080268 A1 | 3/2016 | Anand et al. |
| 2016/0226762 A1 | 8/2016 | Zhang et al. |
| 2017/0076291 A1 | 3/2017 | Cairns et al. |
| 2017/0155628 A1 | 6/2017 | Rohloff et al. |
| 2017/0223154 A1* | 8/2017 | Hammam ............. H04L 47/125 |
| 2018/0054438 A1 | 2/2018 | Li et al. |
| 2018/0091417 A1* | 3/2018 | Ore ........................ H04L 45/28 |

OTHER PUBLICATIONS

"Aruba Central Support Page: Advertising Overlay Routes", Hewlett Packard Enterprise Development, 2021, 8 pages, https://help.central.arubanetworks.com/latest/documentation/online_help/content/gateways/cfg/routing/overlay_routing.htm.

"Aruba SD-WAN Solution, User Guide", Hewlett Packard Enterprise Company, 2019, 316 pages.

"FAQ: Vormetric Key Management Key Vault", Version 5.2, May 14, 2012, 5 pages.

"FAQ: Vormetric Key Management—Key Agent for Oracle Transparent Data Encryption", Version 7.2, Jul. 2, 2012, 8 pages, Vormetric.com.

"Ipsec UDP Mode in Silver Peak Unity EdgeConnect", Silver Peak, Whitepaper, 12 pages, https://www.silver-peak.com/sites/default/files/userdocs/silver-peak-whitepaper-ipsec-udp-1018_1.pdf.

Lara et al., "Network Innovation using OpenFlow: A Survey". IEEE Communications Surveys & Tutorials, vol. 16, No. 1, First Quarter 2014, pp. 1-21.

\* cited by examiner

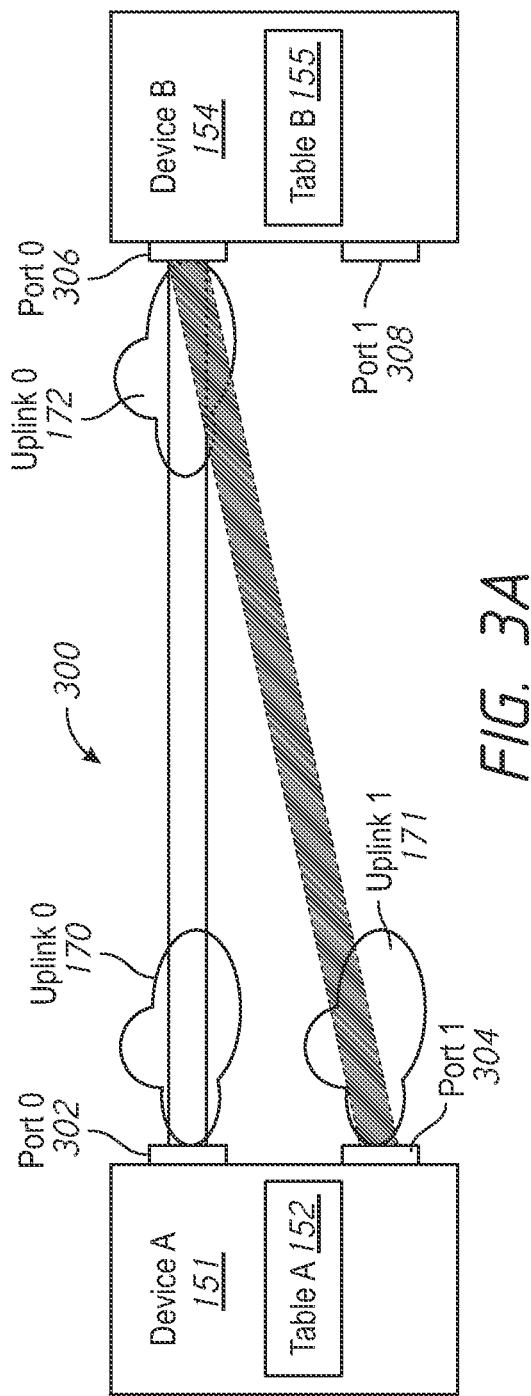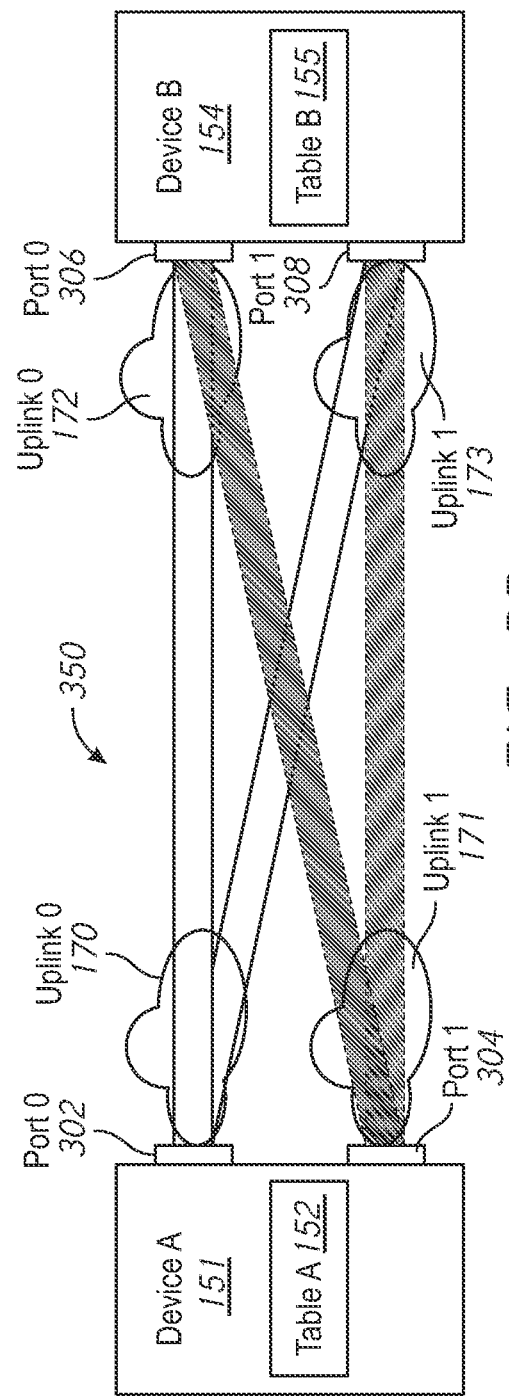

Contact point registry 400

| Device (402) | Uplink Identifier (404) | Uplink Type (406) | Device Private Contact Point Information (408) | | Device Public Contact Point Information (410) | | Peer Devices (412) | Hub/Spoke (414) |
|---|---|---|---|---|---|---|---|---|
| | | | IP Address | Port | IP Address | Port | | |
| A | 0 | MPLS | 10.0.10.0 | 50234 | 10.0.10.0 | 50234 | B,C | Hub |
| A | 1 | MPLS | 10.1.1.30 | 56876 | 10.1.1.30 | 56876 | B,C | Hub |
| A | 2 | Internet | 10.10.10.10 | 58000 | 25.25.25.25 | 57750 | B,C | Hub |
| B | 0 | Internet | 172.16.0.2 | 51497 | 24.6.216.39 | 35867 | A | Spoke |
| B | 1 | Internet | 172.10.10.20 | 52000 | 24.10.20.30 | 35800 | A | Spoke |
| C | 0 | MPLS | 192.168.1.1 | 60583 | 70.108.34.0 | 41234 | A,D | Hub |
| C | 1 | Internet | 192.1.50.50 | 60500 | 70.1.20.20 | 43987 | A,D | Hub |
| D | 0 | MPLS | 10.255.0.255 | 61761 | 96.42.255.26 | 56287 | C | Spoke |
| D | 1 | Internet | | | | | C | Spoke |

FIG. 4A

Local Peer Contact point Table 450

| Peer Device ID (452) | Uplink Identifier (454) | Uplink Type (456) | Peer Device Private Contact Point (458) | | Peer Device Public Contact Point (460) | | Status (462) |
|---|---|---|---|---|---|---|---|
| | | | IP Address | Port | IP Address | Port | |
| B | 0 | Internet | 172.16.0.2 | 51497 | 24.6.216.39 | 35867 | Online |
| B | 1 | Internet | 172.10.10.20 | 52000 | 24.10.20.30 | 35800 | Online |
| C | 0 | MPLS | 192.168.1.1 | 60583 | 70.108.34.0 | 41234 | Offline |
| C | 1 | Internet | 192.1.50.50 | 60500 | 70.1.20.20 | 43987 | Online |

FIG. 4B

ESTABLISHING A PRIVATE NETWORK USING MULTI-UPLINK CAPABLE NETWORK DEVICES

RELATED APPLICATION

This application is a continuation of U.S. patent application Ser. No. 17/176,779, filed on Feb. 16, 2021, which in turn, is a continuation of U.S. patent application Ser. No. 17/110,484, filed on Dec. 3, 2020, which in turn, is a continuation of U.S. patent application Ser. No. 15/984,243, filed on May 18, 2018, now U.S. Pat. No. 10,917,926, which in turn, is a continuation application of U.S. patent application Ser. No. 14/974,331, filed on Dec. 18, 2015, now U.S. Pat. No. 9,980,303, the contents of which are incorporated herein by reference in their entireties.

TECHNICAL FIELD

The present disclosure relates to communication networks, and in particular, to the establishment of private network data tunnels between networking devices.

BACKGROUND

As a business organization grows and spreads out to geographically separated branch locations, the associated information technology (IT) network infrastructure often also changes. One aspect of changing IT network infrastructure is the desire to establish and maintain a secure private network associated with the business organization that is distributed geographically. In many cases, a private network between branch locations is established over public networks. One example of this networking technique is site-to-site virtual private network (VPN) deployment. To set up and maintain these private networks, various networking devices such as routers, switches and security appliances are utilized.

In recent years, various technology trends such as the migration of computing resources to the cloud, and a rapid increase in mobile device data usage have contributed to an increase in private network traffic among networking devices. Networking devices have traditionally been limited to only using one network connection to support establishment of a private network, even if the networking device had multiple external-facing ports that could support other network connections. Although this technique offers simplicity, the limitation of using a single network connection to establish a private network has resulted in a bandwidth constraint as the demand for networking resources increases.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 3A is a block diagram illustrating the establishment of data tunnels at a multi-uplink network device.

FIG. 3B is a block diagram illustrating the establishment of data tunnels between multi-uplink network devices.

FIG. 4A is an example of a contact point registry for multi-uplink network devices in accordance with some implementations.

FIG. 4B is an example of a local multi-uplink peer contact point table in accordance with some implementations.

Figure 1:
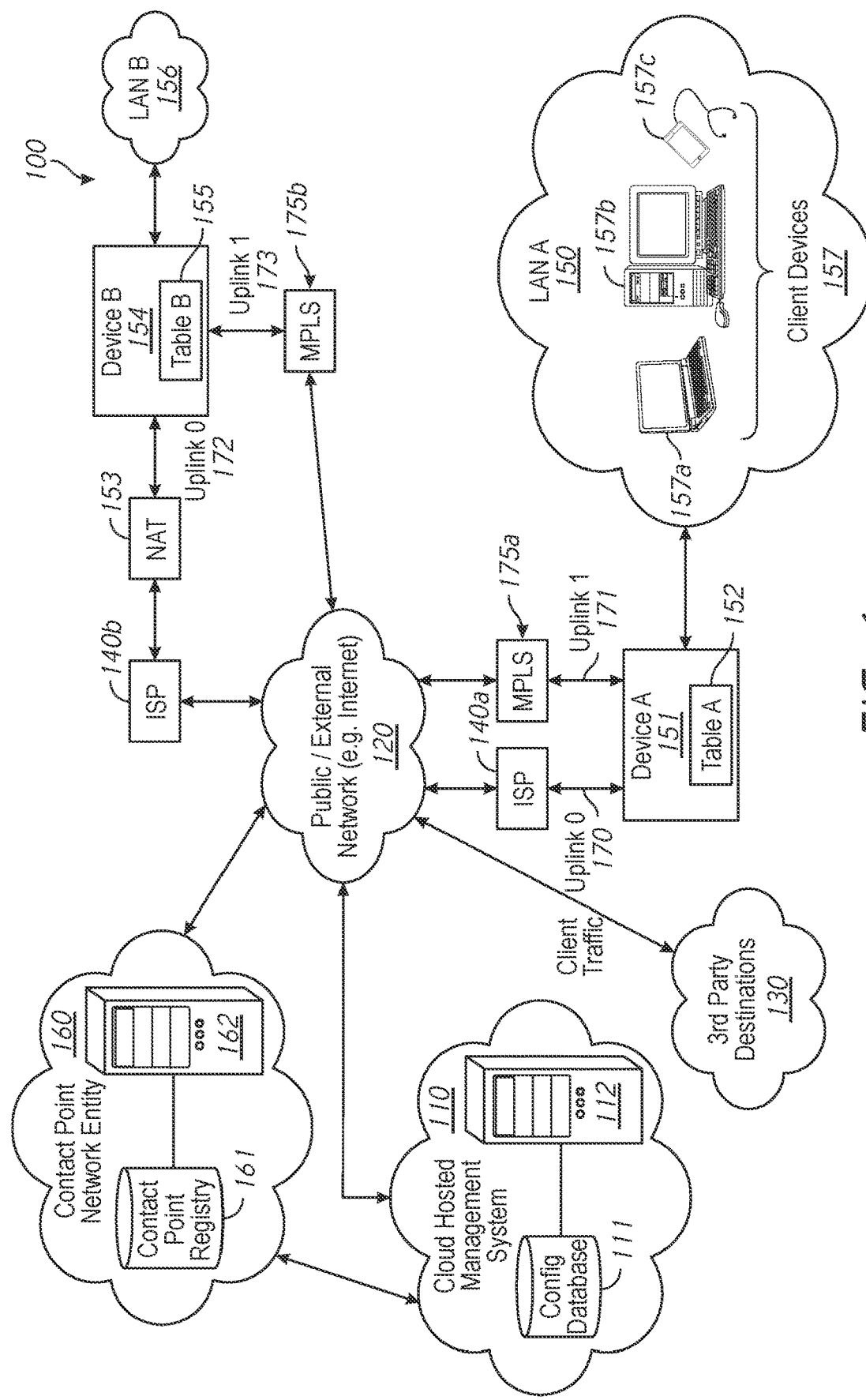
FIG. 1 is a block diagram of a networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Previous solutions to the problem of supporting a private network among network devices actively using a single uplink, fail to provide systems or processes that support the establishment of a private network among multi-uplink networking devices. By contrast, and to that end, various implementations disclosed herein include systems, methods and apparatuses that involve a first network device using uplink identifiers to identify respective uplinks involved in the establishment of data tunnels to other network devices. For example, in some implementations, a method includes obtaining contact point information of a second device associated with the first device, as a peer device in a private network, where the contact point information of the second device includes one or more peer uplink identifiers and each respective peer uplink identifier corresponds to a respective peer device uplink of the second device. The method includes establishing a first private network data tunnel from a first uplink of the first device to the second device, using the contact point information of the second device, and a first uplink identifier associated with the first uplink. The method also includes establishing a second private network data tunnel from a second uplink of the first device to the second device, using the contact point information of the second device, and a second uplink identifier associated with the second uplink.

Various implementations disclosed herein include systems, methods and apparatuses that share and maintain addressing information for networking devices of a given network, at a network entity. For example, in some implementations, a method includes receiving a first registry request message from a first uplink of a first device having two or more uplinks, where each respective uplink is associated with a respective uplink identifier, and the first registry request message includes a first portion and a second portion, where the first portion is characterized by a first write privilege and the second portion is characterized by a second write privilege different from the first write privilege. The method also includes obtaining first peer contact point information corresponding to one or more peer device uplinks of one or more respective peer devices of the first device, and generating a first response message including the first peer contact point information.

Multi-uplink network devices capable of supporting private networking over two or more uplinks create at least two major challenges to address. First, any respective multi-uplink network device of a network prefers to be able to establish and use private network data tunnels with other network devices by properly addressing the various uplink connections involved. Second, multi-uplink network devices of a network prefer to convey and obtain addressing information corresponding to each and every uplink configured to establish private network data tunnels.

FIG. 1 is a block diagram of a networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, networking environment 100 includes a public/external network 120 (e.g., a portion of the Internet), one or more third-party destinations 130, a cloud hosted network management system 110, a contact point network entity 160, an optional network address translation device (NAT) 153, optional Internet service provider (ISP) nodes 140*a* and 140*b*, optional multiprotocol label switching (MPLS) nodes 175*a* and 175*b*, network device A 151 having Table A 152 and network device B 154 having Table B 155, and local area networks LAN A 150 and LAN B 156. In some implementations, MPLS nodes 175*a* and 175*b* are ISP nodes similar to ISP nodes 140*a* and 140*b*. In some embodiments, MPLS node 175*a* is the same as ISP node 140*a*, and/or MPLS node 175*b* is the same as ISP node 140*b* (e.g., the same Internet service provider supplies each connection).

Moreover, while FIG. 1 includes only two LANs (e.g., LAN A 150 and LAN B 156), those of ordinary skill in the art will appreciate that in some implementations, a private network is associated with an arbitrary number of geographically distributed and/or collocated local area networks. Similarly, while FIG. 1 illustrates two example network devices (e.g., Device A 151 and Device B 154), in some implementations a private network includes more than two network devices.

In various implementations, LANs (e.g., LAN A 150 and/or LAN B 154) include additional infrastructure not shown in FIG. 1, such as a gateway node, and/or a network root node. In some implementations, LANs are associated with a number of compliant networking devices, and/or a number of non-compliant networking devices, where compliant devices are configured to communicate particular information with the cloud hosted network management system 110. For example, compliant devices are configured to share status information, configuration information and/or network traffic information with the cloud hosted network management system 110 and/or other compliant devices. In some implementations, a number of client devices 157 are operating within a respective LAN.

The network devices shown in FIG. 1, Device A 151 and Device B 154 are capable of establishing private network tunnels (e.g., VPN data tunnels) simultaneously using two or more uplinks. In some embodiments, at least one uplink for a respective network device uses a public network connection and at least one uplink for a respective network device uses a higher-quality connection. For example, Device A 151 uses Uplink 0 170 to connect to public/external network 120 using a low-cost and lower quality link provided by ISP 140*a*, and Uplink 1 171 to connect to a higher-quality MPLS link 175*a*. Unlike network devices utilizing a "hot standby" or backup uplink, Device A 151 uses at least two uplinks on an active basis during normal operation. The multi-uplink network devices shown in FIG. 1 each show two active uplinks, however those of ordinary skill in the art will appreciate from the present disclosure that in some embodiments, the multi-uplink devices disclosed herein utilize more than two simultaneously active uplinks. Furthermore, while the multi-uplink network devices shown in FIG. 1 show the use of Internet and MPLS uplinks, those of ordinary skill in the art will appreciate from the present disclosure that in some embodiments, the uplink connections include other technologies, including satellite services such as very small aperture terminal (VSAT) links.

In some embodiments, network devices with this multi-uplink capability selectively route network traffic over data tunnels established between network devices, for various reasons. For example, one reason is to reduce bandwidth-related costs associated with the use of high-quality network connections, such as MPLS, which can be supplemented with a lower-cost network connection, such as an Internet connection. In some embodiments, multi-uplink network devices selectively route network traffic over data tunnels, to isolate sensitive data and ensure there is adequate bandwidth for high priority activities such as transferring payment information. For example, a multi-uplink networking device can route credit card transaction information through a tunnel using its MPLS uplink, and route web-surfing traffic through a tunnel using its Internet uplink.

The one or more third-party destinations 130 provide various third-party content and services, such as email, media content, online banking, social networking servers, etc. Other than providing sources and/or destinations for client data traffic, the details of the one or more third-party destinations 130 are not particularly pertinent to the scope of the present disclosure. As such, no further details pertaining to the one or more third-party destinations 130 are provided for the sake of brevity.

FIG. 1 further illustrates that Device A 151 connects LAN A 150 to the public network 120 through an optional ISP node 140a, and in some embodiments, includes features such as a firewall. In some implementations, a network device such as Device A 151 is provided as a single entity (e.g., a router, a virtual machine, etc.). In some implementations, a network device such as Device A 151 includes a distributed system including a suitable combination of software, data structures, virtual machines, computing devices, servers, switches and routers. Merely for the sake of brevity and convenience of explanation, network devices are described herein as single entities.

In some implementations, network devices, such as Device A 151 and/or Device B 154, include routers and/or provide routing functionality. In some implementations, a network device operates in connection with other networking appliances such as NAT devices (e.g., NAT 153), while in some implementations at least some of the functionality of one or more other appliances is built into the network devices. In some embodiments, network devices are capable of filtering network traffic to and from client devices 157, and optionally performing this filtering on the basis of Layer 7 (of the OSI model) packet information. In some implementations, network devices such as Device A 151 and/or Device B 154, are used to establish private networks (e.g., virtual private networks or VPNs) between themselves. In some of these implementations, some or all network traffic from client devices 157 can be routed through a network device over a private network. For example, Device A 151 is configured to allow VPN traffic from client device 157a to go through a VPN data tunnel established with Device B 154, destined for another client device on LAN B 156. In this same example, Device A 151 allows network traffic from client devices 157 destined for a 3$^{rd}$ party destination 130 to travel over the public/external network 120.

The networking environment 100 includes a contact point network entity 160 configured to maintain, obtain and/or report addressing information for networking devices, such as Device A 151 and/or Device B 154. In some embodiments, contact point network entity 160 is a part of cloud hosted management server 110. In some implementations, contact point network entity 160 and cloud hosted management server 110 reside on a single network entity, such as a group of servers, a single server machine or portions of several servers that are not dedicated to these services.

Contact point network entity 160 includes a contact point registry 161 for storing contact point information of network devices, a contact point server 162, and in some implementations, a gateway device providing access to public network 120 for contact point network entity 160. Contact point network entity 160 includes addressing information for one or more multi-uplink routers of networking environment 100.

The addressing information stored at contact point network entity 160 comprises various elements. For example, such addressing information includes uplink identifiers, Internet Protocol (IP) addresses, port numbers, device identifiers, device serial numbers, user-selected device names, geographic location data, client identification (e.g., ABC Coffee Shops or client 2395), and/or device connectivity information. In some implementations, the addressing information stored at contact point network entity 160 includes private addressing information and public addressing information. For example, Uplink 0 172 of network device B 154 operates behind NAT 153, and consequently has a public IP address and public port number that are both accessible and visible from public network 120, and a private IP address and private port number. In some implementations, a set of addressing information for a respective device or for a respective uplink of a multi-uplink device is referred to as contact point information. For example, contact point network entity 160 has contact point information corresponding to Uplink 0 170 of Device A 151, such as a private IP address, a private port number, a public IP address, a public port number, an uplink identifier and a device identifier.

In some embodiments, contact point information is indexed in the contact point registry 161, on the basis of network devices, and sub-indexed by uplinks of respective network devices (e.g., using device and uplink identifiers). In some embodiments, a subset of a respective uplink's contact point information is referred to as public contact point information and another subset of the uplink's contact point information is referred to as private contact point information. For example, the private IP address and private port number associated with Uplink 1 173 of Device B 154, is included in the private contact point information of that specific uplink of that specific device. In some implementations, an uplink of a networking device only has private contact point information or public contact point information, or both sets of contact point information are the same. For example, Uplink 1 171 of Device A 151 is not associated with a NAT device, so it is only associated with one IP address and one port number.

FIG. 1 illustrates that Device A 151 includes a local peer contact point table, Table A 152. In some embodiments, one or more networking devices of a private network have a local peer contact point table containing some or all of a the contact point information stored at contact point registry 161. In some embodiments, a local peer contact point table has contact point information for peer network devices (including multi-uplink network devices) of a respective network device. In some embodiments, peer network devices of a respective network device are network devices with which the respective network device shares a communication path or data tunnel. For example, Table A 152 of Device A 151 has a private IP address and private port number and public IP address and public port number corresponding to Uplink 0 172 of Device B 154, and similarly for Uplink 1 173 of Device B 154, a peer device to Device A 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157a, workstation 157b, smartphone 157c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

The cloud hosted network management system 110 is configured to manage the configuration and operation of compliant devices in a LAN and/or across geographically distributed portions of a VLAN. To that end, the cloud hosted network management system 110 includes a configuration database 111 for storing configuration information of compliant devices, a cloud hosted management server 112, and in some implementations, a gateway device. In some embodiments, compliant devices are configured to communicate particular information with the cloud hosted network management system 110. For example, compliant devices are configured to share status information, configuration information and/or network traffic information with the cloud hosted network management system 110 and/or other compliant devices. In some embodiments, the network devices, Device A 151 and Device B 154, of FIG. 1 are compliant devices.

In some implementations, a gateway device (not shown) connects the cloud hosted management server 112 to the public network 120 so that the cloud hosted management server 112 is able to communicate with one or more LANs and/or geographically distributed portions of a VLAN, and optionally includes features such as a firewall. In some implementations, a gateway device is provided as a single entity (e.g., a server, a virtual machine, etc.). In some implementations, a gateway device includes a distributed system including a suitable combination of software, data structures, virtual machines, computing devices, servers, switches and routers. Merely for the sake of brevity and convenience of explanation, the optional gateway device is described herein as a single entity.

FIG. 1 illustrates the use of ISP node 140a to link LAN A 150 to the public network 120 using Uplink 0 170, and the use of ISP node 140b to link LAN B 156 to the public network 120 using Uplink 0 172. In some embodiments an ISP node is not required to link a local area network to a public network. In various implementations, ISP nodes 140a and/or 140b are each provided as a single entity (e.g., a server, a virtual machine, etc.). In some implementations, ISP node 140a and/or 140b are each implemented as a distributed system including a suitable combination of software, data structures, virtual machines, computing devices, servers, switches and routers. For the sake of brevity and convenience of explanation, the ISP nodes 140a and 140b are each described herein as a single entity.

Figure 2:
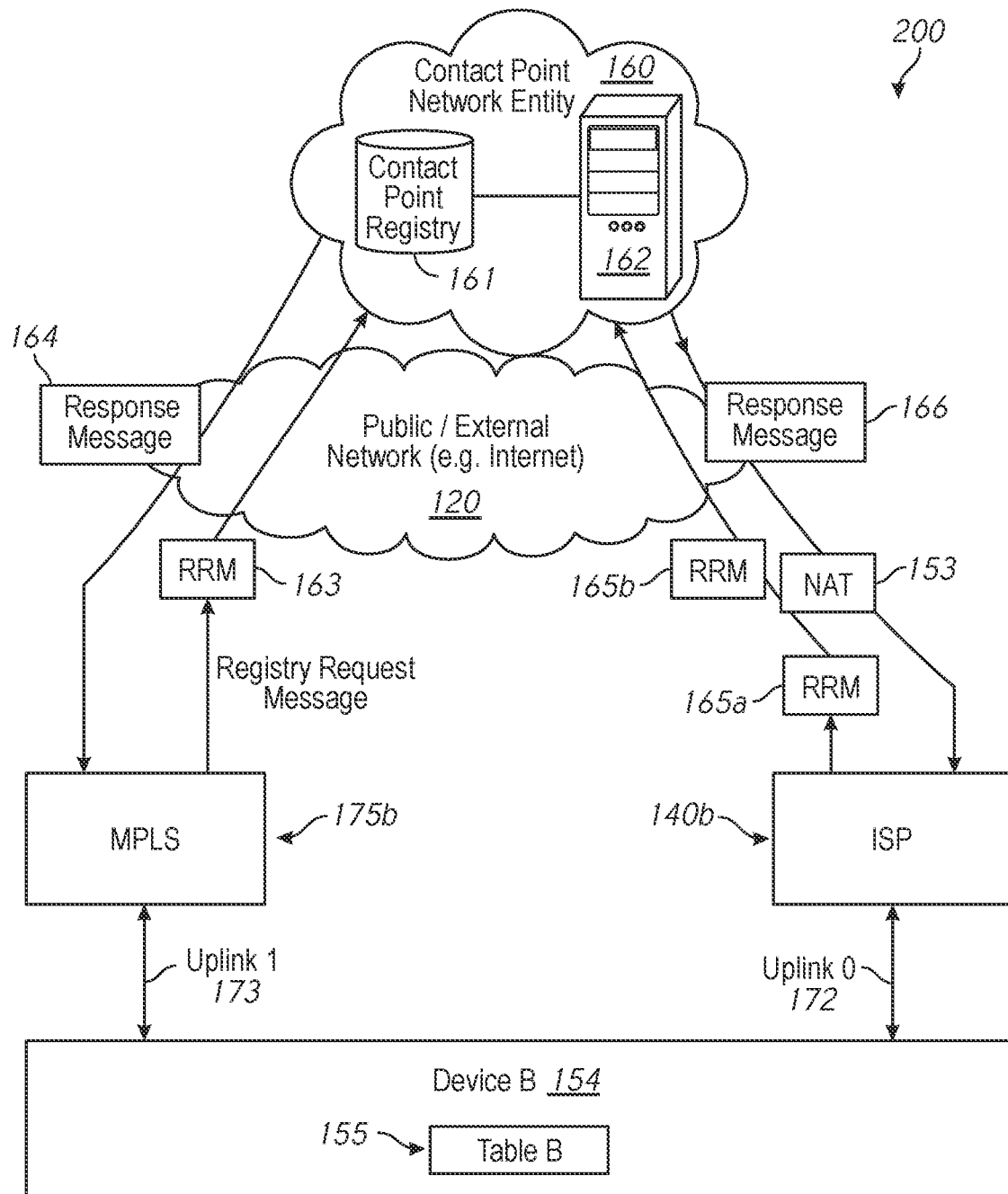
FIG. 2 is a block diagram illustrating the flow of messages among entities of a networking environment in accordance with some implementations.

FIG. 2 is a block diagram illustrating the flow of messages among entities of a networking environment 200 in accordance with some implementations. For the sake of brevity and convenience of explanation, some elements from networking environment 100, described with respect to FIG. 1, have been removed from FIG. 2, however those of ordinary skill in the art will appreciate from the present disclosure that in some embodiments, these elements exist in networking environment 200, and function as described earlier. Networking environment 200 illustrates one example network device, Device B 154, communicating with the contact point network entity 160, however those of ordinary skill in the art will appreciate from the present disclosure that in some embodiments, at any given point in time, contact point network entity 160 is in communication with several other network devices, optionally including network devices not associated with networking environment 200 or networking environment 100. In some embodiments, an uplink of a network device is in direct communication with contact point network entity 160, as exhibited by Uplink 1 173 of Device B 154, while in some embodiments, an uplink of a network device has a NAT device (e.g., NAT 153) in the path of communication with contact point network entity 160, as is the case for Uplink 0 172 of Device B 154, in FIG. 2. In some implementations a NAT device provides a firewall for network traffic going to or from a network device.

In the example shown in FIG. 2, multi-uplink network device B 154 generates special communications called registry request messages such as RRM 163, and conveys these registry request messages from its respective uplinks to the contact point network entity 160. In some implementations a respective network device transmits registry request messages to the contact point network entity 160. For example, transmission of a registry request message is also referred to as a "push" activity by the network device. In some implementations registry request messages are retrieved from network devices, by contact point network entity 160. For example, retrieval of a registry request message is also referred to as a "pull" activity by contact point network entity 160. Regardless of the particular mechanism, in various implementations a registry request message corresponding to a particular uplink of a network device arrives at the contact point network entity 160 on a periodic basis (e.g., every 10 seconds). In some implementations, the frequency with which these uplink-specific registry request messages are received is analyzed by contact point network entity 160. For example, a longer than average receipt time indicates a problem with the corresponding uplink of the network device. In some implementations, not receiving any registry request messages associated with any uplink of a network device is interpreted by contact point network entity 160 to mean that the entire network device is offline.

In some embodiments, an uplink-specific registry request message has a first portion and a second portion of the message, such as a header and a payload. In some implementations, the first portion is characterized as having a first write privilege, and the second portion is characterized as having a second write privilege. For example, the first portion of the registry request message permits information to be deleted, supplemented and/or modified, while the second portion of the registry request message includes information that is read-only, and therefore information cannot be supplemented, deleted or modified. However, in some implementations the first portion and the second portion of the registry request message have the same read and/or write privileges. In some implementations, generating the registry request message includes the multi-uplink network device writing the IP address, port number, uplink identifier and/or any other addressing information corresponding to a respective uplink to one or more portions of the registry request message.

FIG. 2 also illustrates an example of how a NAT device such as NAT 153, intercepts uplink-specific registry request messages traveling from a network device to contact point network entity 160. For example, Device B generates uplink-specific registry request message RRM 165a associated with Uplink 0 172, which is intercepted by NAT 153 en route to contact point network entity 160. In this same example, RRM 165b represents the same registry request message generated by Device B 154 and associated with Uplink 0 172, after passing through NAT 153. In some implementations a NAT intercepts and modifies at least a portion of a registry request message, creating a modified registry request message for contact point network entity 160. For example, an uplink-specific registry request message such as RRM 165a has a header portion and a payload portion (e.g., a first portion and a second portion), and NAT 153 rewrites or adds addressing information to the header of the registry request message RRM 165a. In some embodiments, a NAT device provides the public contact point information, such as public IP address and public port number used to access a respective uplink of a particular network device, and the NAT device writes this public contact point information to a portion of an uplink-specific registry request message passing through it.

In some implementations, an uplink-specific registry request message selectively includes one or more additional components. For example, one component is contact point information of the network device that generated the registry request message and the uplink associated with it. Another example of a component is a request for uplink-specific contact point information of one or more peer devices of the network device that generated the registry request message. In some implementations a request for contact point information includes device identifiers and/or uplink identifiers for the one or more peer devices.

In some implementations, a respective network device acquires these device identifiers and/or uplink identifiers when it receives configuration information from an external source such as cloud hosted management system 110 (FIG. 1). In some implementations, there is a unique uplink identifier to identify a respective uplink out of all the networking devices in a given networking environment. In some implementations a respective network device (e.g., Device B 154) receives configuration information on a periodic basis, or when a change in configuration is performed. In some of these implementations, contents of the local peer contact point information table (e.g., Table B 155) are modified to add entries for new peer devices or delete entries for removed peer devices.

Contact point network entity 160, is shown to have generated response messages, namely response message 164 to Uplink 1 173 of Device B 154 and response message 166 to Uplink 0 172 of Device B 154. In some implementations, a respective response message corresponds to a respective uplink-specific registry request message. For example, response message 164 en route to Uplink 0 172, is generated by contact point network entity 160 in response to receiving uplink-specific registry request message 163. In some embodiments, a response message includes requested contact point information for peer devices of the requesting network device and/or the requesting uplink of the requesting network device. As shown in FIG. 2, in some embodiments a response message such as response message 166 passes through a NAT device such as NAT 153, located between contact point network entity 160 and a respective uplink of a network device such as Uplink 0 172 of Device B 154. In some implementations, a NAT device modifies a response message passing through to a respective uplink of a network device. For example, NAT 153 writes its own IP address and port number (e.g., a public IP address and public port number) to a portion of response message 166 that has write privileges, so that Device B 154 can determine that Uplink 0 172 is located behind NAT 153 by reading the modified response message.

FIG. 3A is a block diagram 300 illustrating the establishment of data tunnels at a multi-uplink network device. In FIG. 3A, example multi-uplink network device A 151 has two uplinks, Uplink 0 170 and Uplink 1 171, configured to establish private network data tunnels (e.g., VPN tunnels) with another network device. In the example shown in FIG. 3A, a multi-uplink network device has two active uplinks for establishing data tunnels, however those of ordinary skill in the art will appreciate from the present disclosure that in some embodiments, a multi-uplink network device has more than two active uplinks for establishing data tunnels. In some embodiments, a respective uplink is associated with a respective port of a network device. For example, port 0 302 of Device A 151 is associated with Uplink 0 170, and port 1 304 is associated with Uplink 1 171. In some embodiments, a respective uplink of a network device can be swapped to a new or different port, or replaced with a new uplink. For example, if the IT budget of a branch office increases, it is able to upgrade an Internet uplink by replacing it with an MPLS uplink.

In some embodiments, a multi-uplink network device establishes one or more data tunnels to a network device with only one uplink configured to establish and actively use private network data tunnels. For example, FIG. 3A illustrates two data tunnels associated with Device A 151, each tunnel having one end associated with one uplink and/or port of Device B 154. In this example, Device B 154 has a port 0 306 associated with Uplink 0 172, and another port 1 308 not associated with an uplink. In some implementations, this arrangement of established data tunnels indicates that Device B is only programmed to allow private network (e.g., VPN) traffic over one uplink. In some implementations, this arrangement of established data tunnels is indicative that Device B only has one uplink, or that it is a multi-uplink network device with one or more uplinks that have gone offline. This example illustrates that multi-uplink network devices are configured to use more than one uplink, and in particular, that they are configured to simultaneously use more than one uplink to establish a private network data tunnel. In some embodiments, a multi-uplink network device is referred to as an "active-active" network device, because it has at least two uplinks that actively allow establishing and using private network data tunnels at the same time.

FIG. 3B is a block diagram 350 illustrating the establishment of data tunnels between multi-uplink network devices. In the example of FIG. 3B, Device B 154 is a multi-uplink network device configured to establish and use private network data tunnels over at least two uplinks, including Uplink 1 173 associated with port 1 308. Here, it can be seen that Device A 151 is now able to establish and/or use four possible private network data tunnels to communicate with Device B 154, where each uplink of Device A 151 is associated with two distinct data tunnels respectively associated with the two uplinks of Device B 154.

In some embodiments, establishing a respective data tunnel between Device A 51 and Device B 154 includes having knowledge of specific addressing information corresponding to each respective uplink and/or port associated with the data tunnel. For example, if Device A 151 is the multi-uplink networking device initiating establishment of a data tunnel, it must obtain contact point information corresponding to Uplink 0 172 and Uplink 1 173 of Device B 154. In some embodiments, Device A 151 obtains this uplink-specific contact point information from its local peer contact point table A 152. In some embodiments, Device A 151 obtains this uplink-specific contact point information from another source, such as contact point network entity 160 shown in FIG. 2.

In some embodiments, in order to establish a respective data tunnel, after Device A 151 obtains contact point information for the uplinks of Device B 154, it creates a packet or set of packets to send over one its own uplinks, such as Uplink 0 170 to a particular port of Device B 154 associated with a particular uplink, such as Port 1 308 associated with Uplink 1 173. In some implementations, these are referred to as "Hello" packets or test packets, and are sent periodically to keep a tunnel between two devices active. In some implementations, this packet or set of packets has addressing information corresponding to Uplink 0 170, such as an uplink identifier, and also contains the obtained contact point information corresponding to Port 1 308 and/or Uplink 1 173, including a peer device uplink identifier for Uplink 1 173. In some embodiments, if Device A 151 does not have current or accurate contact point information for Uplink 1 173 of Device B 154, the packet or set of packets will be dropped and device A 151 will reattempt to obtain the contact point information for Uplink 1 173 and reattempt to establish the data tunnel. In some implementations, Device B 154 generates and sends an acknowledgment packet back to Uplink 0 170 of Device A 151 over Uplink 1 173.

FIG. 4A is a table 400 representing the contents of a contact point registry in accordance with some implementations. Table 400 includes columns 402, 404, 406, 408, 410, 412 and 414, and entries 416, 418, 420, 422, 424, 426, 428, 430, and 432. Within table 400, column 402 stores one or more device identifiers for each respective network device. In this example distinct alphanumeric characters are used to identify respective network devices, however those of ordinary skill in the art will appreciate from the present disclosure that in some embodiments, this is not a limiting example of unique identifiers of network devices of a given network (or private network). In some implementations, more than one identifier is stored for a respective network device (e.g., a user-selected name and a unique system-generated number). In some implementations, a network device has an identifier that is unique among all compliant network devices in existence, even beyond the given network.

Column 404 stores uplink identifiers for respective uplinks of each network device. In some implementations, respective uplink identifiers are unique for a respective network device, as shown in table 400. In this example distinct alphanumeric characters are used to identify respective uplinks, however those of ordinary skill in the art will appreciate from the present disclosure that in some embodiments, this is not a limiting example of unique identifiers of uplinks of a given network device. In some implementations, an uplink for a respective network device has an identifier that is unique amongst all uplinks of network devices in existence, even beyond the given network. Column 406 stores information about the type of connection associated with a respective uplink. For example, entry 430 shows that Uplink 0 of Device D is an MPLS connection.

Column 408 illustrates an example of how private contact point information can be stored. In some implementations, private contact point information associated with a respective uplink of a respective network device includes a pair of a private IP address and a private port number. For example, entry 416 shows that the private contact point information of Uplink 0 of Device A includes the private IP address 10.0.10.0 and private port number of 50234. Column 410 illustrates an example of stored public contact point information. In some embodiments, public contact point information associated with a respective network device includes a pair of a public IP address and a public port number. In some implementations, the private contact point information and public contact point information for a respective device are the same. For example, Uplink 0 of Device A in entry 416 has the same IP address and port number for both since there is no intermediate NAT device between Uplink 0 of Device A and the contact point network entity, as shown in FIG. 1.

In some implementations, the contact point registry has a column 412 for storing the peer devices of a respective network device. For example, in entry 420, associated with Device A, it is shown that Device B and Device C are peers of Device A. In some implementations, the peer devices of a respective network device are determined from one or more received uplink-specific registry request messages from the respective network device. In some implementations, table 400 includes a column corresponding to peer device uplinks instead of, or in addition to column 412. In some implementations, a respective uplink of a multi-uplink network device is configured to establish data tunnels with specific uplinks of another multi-uplink network device. In these implementations the contact point registry includes information about peer device uplinks for a respective uplink in table 400.

Entry 432 corresponding to Uplink 1 of Device D has empty fields for private contact point information and public contact point information. In some embodiments, empty contact point information indicates that the respective uplink of a respective network device is offline or exhibiting a communication problem with the contact point network entity.

In some implementations, information such as the information shown in column 414 is included in the contact point registry, to indicate the nature of a respective network device in a particular network topology. For example, the network that includes Device A, Device B, Device C and Device D, has a hub and spoke topology, where one or more network devices is a "hub" device typically connected to at least two other network devices, and one or more network devices is a "spoke" device typically only connected to one other network device. Alternative topologies may be implemented for a given network, and as such, the contact point registry may include information for each respective network device, for those alternative topologies. The columns and information shown in FIG. 3A are merely examples of the type of information found in a contact point registry, however those of ordinary skill in the art will appreciate from the present disclosure that in some embodiments, the contact point registry includes additional information (e.g., status information, or time since last registry request message received), or less information than shown.

FIG. 4B is an example of a local peer contact point table 450 in accordance with some implementations. Table 450 includes columns 452, 454, 456, 458, 460 and 462, and entries 464, 466, 468, and 470. For example, local peer contact point table 450 is stored at Device A 151, in FIG. 1. In some implementations, table 450 includes a subset of the information in the contact point registry, while in some implementations table 450 includes additional information (e.g., status column 462). The example in FIG. 4B shows that Device A has two peer multi-uplink devices, Device B and Device C. In this example, private contact point information 458 is stored for each peer device uplink, including a private IP address and private port number for each respective uplink of each respective peer network device. Additionally, peer device public contact point information 460 is stored, and in this case that includes storing a public IP address and public port number for each respective peer device uplink. Table 450 also includes a status column 462, to store an indicator of whether or not a respective uplink of a respective peer network device is online or offline. For example, entry 468 corresponding to Uplink 0 of Device C indicates that this uplink is offline, while entry 470 corresponding to Uplink 1 of Device C indicates that this uplink is online.

Figure 5:
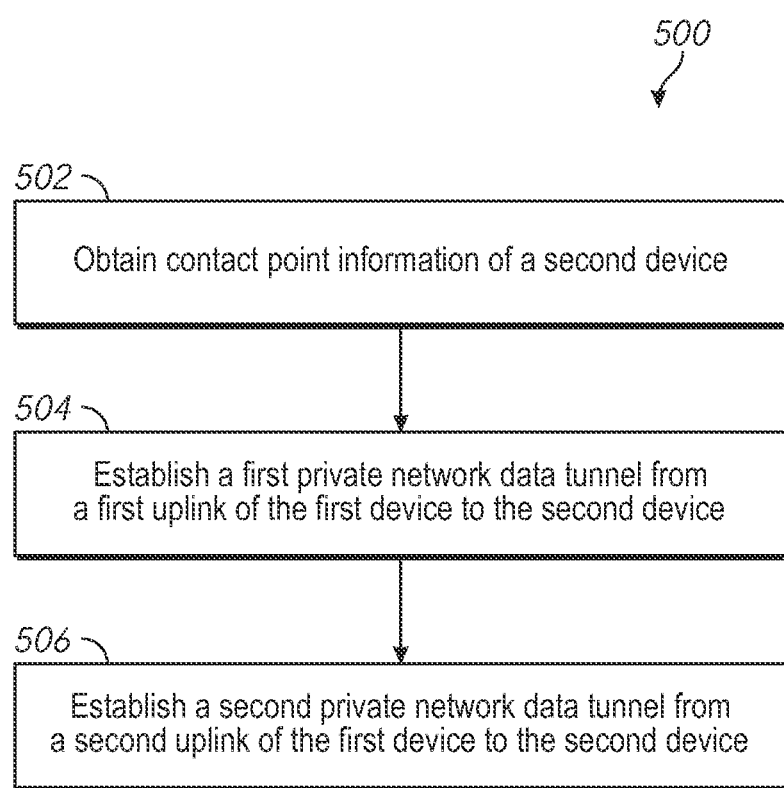
FIG. 5 is a flowchart representation of a method of establishing private network data tunnels between multi-uplink network devices in accordance with some implementations.

FIG. 5 is a flowchart representation of a method 500 of establishing private network data tunnels from a first network device in accordance with some implementations. For the sake of additional clarity and detail, the method 500 is described with reference to FIG. 1, FIG. 2, FIGS. 3A and 3B, and FIGS. 4A and 4B. In some implementations, method 500 is performed at a multi-uplink network device, such as Device A 151 or Device B 154, in FIG. 1. In some implementations, method 500 is performed at a device operating as a router and/or as a gateway node. In some implementations, method 500 is performed by one or more devices in communication with each other through a private network, such as a VPN.

Method 500 includes a first multi-uplink network device obtaining (502) contact point information of a second network device. In some embodiments, the second network device is also a multi-uplink network device, and its contact point information includes contact point information for each of its respective uplinks. In some embodiments, the obtained contact point information of the second network device includes one or more peer uplink identifiers, where each respective peer uplink identifier corresponds to an uplink of the second network device.

In some embodiments, the first multi-uplink network device obtains the contact point information of the second network device by retrieving it from its own local storage. FIG. 2, as described earlier, illustrates an example of a technique for a respective multi-uplink network device to obtain the most recent contact point information of one or more peer devices, if it does not already have current contact point information in its own local storage. For example, in FIG. 2, Device B 154 generates one or more uplink-specific registry request messages with requested contact point information, each message associated with a respective uplink. In this example, registry request message 163 is associated with Uplink 1 173, an MPLS connection. The example in FIG. 2 further illustrates receipt of registry request message 163 by the contact point network entity 160, generation of response message 164, and eventual receipt of response message 164 at Device B 154 with the requested contact point information of one or more peer network devices.

Method 500 includes the first multi-uplink network device establishing (504) a first private network data tunnel from a first uplink of the network device to the second network device. For example, as shown in FIG. 3A, Device A 151 established a private network data tunnel associated with its own Uplink 0 170, and Uplink 0 172 of Device B 154. In some implementations, establishment of a respective private network data tunnel includes using an uplink identifier to identify the respective uplink of the first network device and the obtained contact point information of the second network device. FIG. 5 shows that method 500 continues with the network device establishing (506) a second private network data tunnel from a second uplink of the network device to the second network device. The example in FIG. 3A also shows a second private network data tunnel established between Device A 151 and Device B 154, associated with Uplink 1 171 and Uplink 0 172 of Device B. The examples in FIG. 3A and FIG. 3B illustrate that one respective uplink of a respective network device can be associated with a plurality of data tunnels.

In some implementations, the first multi-uplink network device creates a packet or set of packets to send over a first uplink of its own uplinks, to a particular port of the second network device associated with a particular peer device uplink, as a part of establishing a private network data tunnel. In some implementations, this packet or set of packets has addressing information that includes an uplink identifier of the first uplink of the first multi-uplink network device, and also contains the obtained contact point information corresponding to the second network device. In some embodiments, if the first multi-uplink network device does not have current or accurate contact point information for the peer device uplink of the second network device, the packet or set of packets will be dropped and the first multi-uplink network device will reattempt to obtain the contact point information for the peer device uplink and reattempt to establish the data tunnel. In some implementations, the second network device generates and sends an acknowledgment packet back to the first uplink of the first multi-uplink network device. In some implementations, establishing a private network data tunnel includes using a "hole-punching" protocol.

Figure 6:
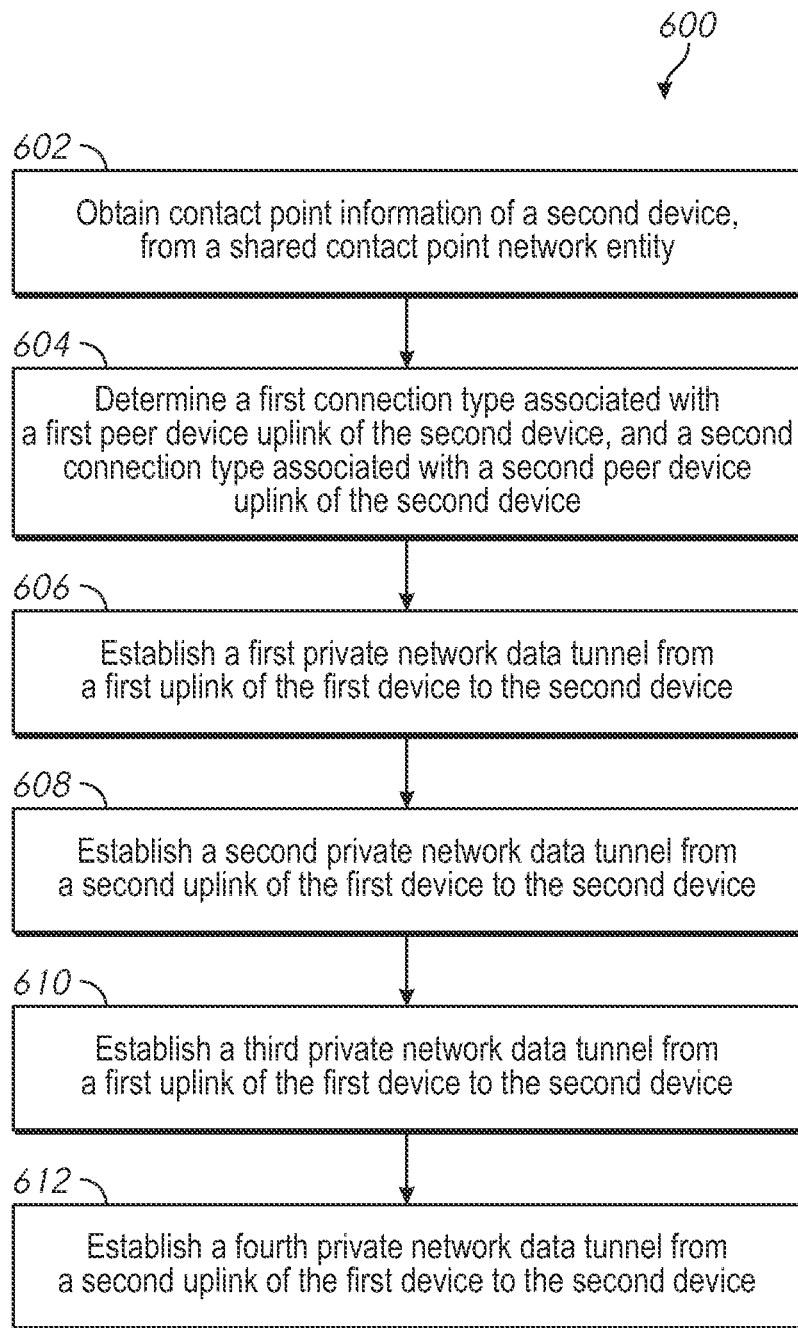
FIG. 6 is a flowchart representation of a method of establishing private network data tunnels between multi-uplink network devices in accordance with some implementations.

FIG. 6 is a flowchart representation of a method 600 of establishing private network data tunnels between multi-uplink network devices in accordance with some implementations. In some implementations, method 600 is an extension or a more detailed process for performing some or all of the activities of method 500 described earlier. As such, for the sake of efficiency, reference is made, when appropriate, to corresponding activities in method 500. For the sake of additional clarity and detail, the method 600 is described with reference to FIG. 1, FIG. 2, FIG. 3A, FIG. 3B, FIG. 4A and FIG. 4B. In some implementations, method 600 is performed at a multi-uplink network device, such as Device A 151 or Device B 154, in FIG. 1. In some implementations, method 600 is performed at a device operating as a router and/or as a gateway node. In some implementations, method 600 is performed by one or more devices in communication with each other through a private network, such as a VPN.

As described above with respect to method 500, method 600 includes a multi-uplink network device obtaining (602) contact point information corresponding to a second network device, from a shared contact point network entity. Furthermore, the method 600 includes the network device determining (604) a first connection type associated with a first peer device uplink of the second device, and a second connection type associated with a second peer device uplink of the second device. For example, FIG. 4B illustrates an example local peer contact point table that a network device uses to obtain contact point information of its peer devices. In this example, if Device B is the second device, columns 454 and 456 indicate that both of Device B's uplinks are Internet connections. In some implementations, this determination of the connection or uplink types of the second network device is included in the establishment of one or more private network data tunnels. For example, Device A is configured with a policy to only establish private network data tunnels with its MPLS uplink to MPLS peer device uplinks.

As described above with respect to method 500, the network device establishes (606) a first private network data tunnel from a first uplink of the network device to the second network device, and establishes (608) a second private network data tunnel from a second uplink of the network device to the second network device.

Method 600 includes establishing (610) a third private network data tunnel from a first uplink of the first multi-uplink network device to the second network device. The method 600 includes establishing (612) a fourth private network data tunnel from a second uplink of the first multi-uplink network device to the second network device. In some implementations, policy reasons prevent the establishment of one or more private network data tunnels between the first multi-uplink network device and the second network device. For example, a multi-uplink network device is configured to turn off its MPLS uplink on weekends for IT maintenance.

Figure 7:
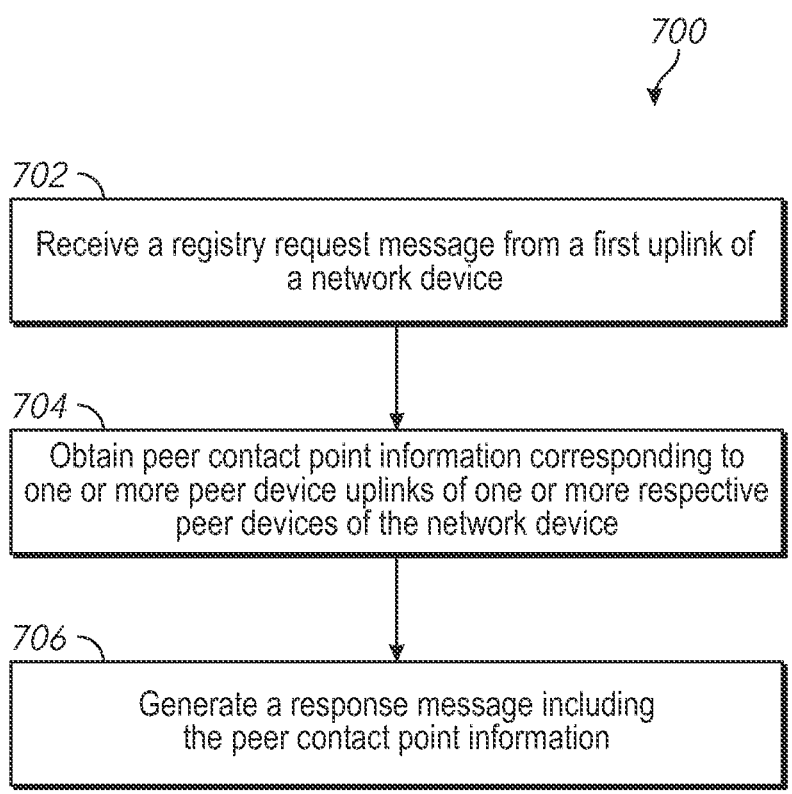
FIG. 7 is a flowchart representation of a method of retrieving contact point information for multi-uplink network devices, at a contact point network entity in accordance with some implementations.

FIG. 7 is a flowchart representation of a method 700 of retrieving contact point information for multi-uplink network devices, performed at a contact point network entity in accordance with some implementations. For the sake of additional clarity and detail, the method 700 is described with reference to FIG. 1, FIG. 2, FIG. 4A and FIG. 4B. In some implementations, method 700 is performed at a network entity or server, such as contact point network entity 160, in FIG. 1. In some implementations, method 700 is performed at a single computing machine, or across several computing machines (e.g., a group of servers). In some implementations, method 700 is performed by one or more computing machines associated with devices in communication with each other through a private network, such as a VPN.

Method 700 includes receiving (702) an uplink-specific registry request message from a first uplink of a multi-uplink network device. For example, FIG. 2 shows contact point network entity 160 obtaining registry request message 163 in association with uplink 1 173 of Device B 154. In this example, registry request message 163 is either transmitted by Device B 154 (e.g., "pushed"), or retrieved by contact point network entity 160 (e.g., "pulled"). The contact point network entity obtains (704) peer contact point information corresponding to one or more peer device uplinks of one or more respective peer devices of the multi-uplink network device, from a contact point registry. In some implementations, this peer contact point information is obtained in response to receiving the registry request message. For example, contact point network entity 160 receives registry request message 163 from Device B 154, and subsequently obtains contact point information for the various uplinks of Device B's 154 peer devices from contact point registry 161.

In some implementations, obtaining the peer contact point information includes detecting which network device generated the received registry request message and which respective uplink is associated with the registry request message. In some implementations, this also includes retrieving a list of that network device's peers and/or a list of peer device uplinks with which the respective uplink is configured to establish data tunnels. For example, contact point network entity 160 determines that message 163 came from Device B 154 in association with uplink 1 173. In this example, contact point network entity 160 also determines that Device A and Device C are peer devices to Device B and that uplink 1 173 is configured to establish data tunnels with uplink 0 of Device A and uplink 0 and uplink 1 of Device C. In some implementations, obtaining the peer contact point information includes reading the content of the received registry request message to determine the peer devices of the network device that generated the registry request message. For example, contact point network entity 160 reads a registry request message generated by Device B 154 to retrieve Device A and Device C's contact point information.

Method 700 continues with generating (706) a response message including the obtained peer contact point information. In some implementations, generating the response message includes writing additional information such as the status of peer devices (e.g., offline, online), the contact point information on record for the network device that sent the first registry request message, timing information, and/or changes in network topology (e.g., a peer device going from a hub to a spoke). In some implementations, method 600 continues with obtaining a second registry request message, optionally from a second network device.

Figure 8:
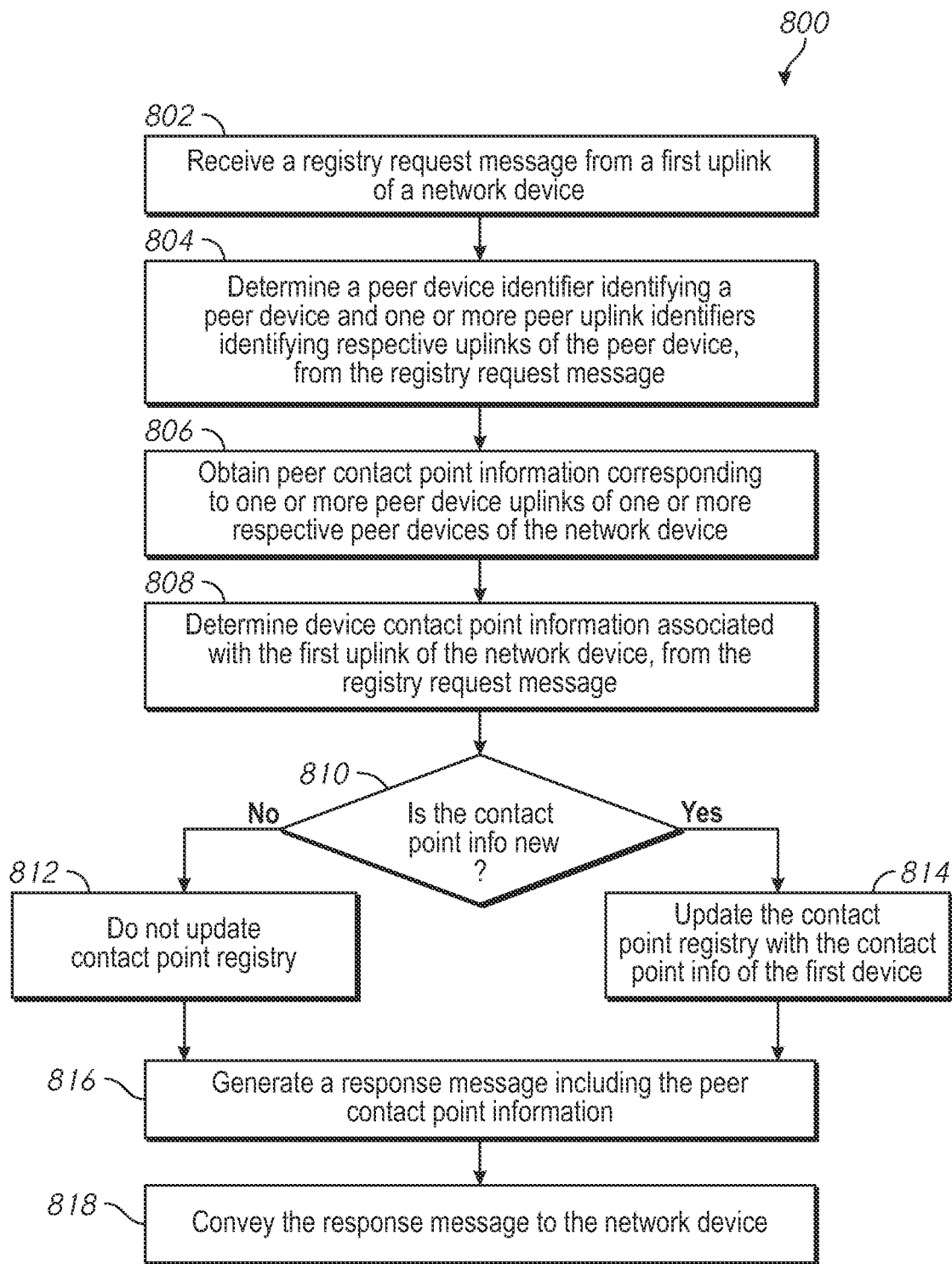
FIG. 8 is a flowchart representation of a method of retrieving contact point information for multi-uplink network devices, at a contact point network entity in accordance with some implementations.

FIG. 8 is a flowchart representation of a method 800 of retrieving contact point information for multi-uplink network devices, performed at a contact point network entity in accordance with some implementations. In some implementations, method 800 is an extension or a more detailed process for performing some or all of the activities of method 700 described earlier. As such, for the sake of efficiency, reference is made, when appropriate, to corresponding activities in method 700. For the sake of additional clarity and detail, the method 800 is described with reference to FIG. 1, FIG. 2 and FIGS. 4A and 4B. In some implementations, method 800 is performed at a network entity or server, such as contact point network entity 160, in FIG. 1. In some implementations, method 800 is performed at a single computing machine, or across several computing machines (e.g., a group of servers). In some implementations, method 800 is performed by one or more computing machines associated with devices in communication with each other through a private network, such as a VPN.

Method 800 includes receiving (802) a registry request message from a first uplink of a network device, as described above with respect to method 700, and determining (804) a peer device identifier identifying a peer device of the network device and one or more peer uplink identifiers identifying respective uplinks of the peer device, from the registry request message. In some implementations, the network device initially obtains the peer device identifiers (e.g., examples shown in column 452, FIG. 4B) and peer uplink identifiers (e.g., examples shown in column 454, FIG. 4B) through the receipt of configuration information (e.g., from the cloud hosted management system 110, FIG. 1). The method 800 includes obtaining (806) peer contact point information corresponding to one or more peer device uplinks of one or more respective peer devices of the network device, as described earlier with respect to method 700.

The contact point network entity determines (808) contact point information associated with the first uplink of the network device, from the registry request message. For example, as described above with respect to FIG. 2, in some implementations, a registry request message includes two or more portions, where each respective portion of the registry request message has a different read and/or write privilege. In this example, the private contact point information of the first uplink of the network device is written to one portion of the registry request message and the public contact point information is written to another portion. In some implementations, determining the contact point information of the first uplink of the network device includes reading the first registry request message, identifying a device identifier corresponding to the first network device, identifying an uplink identifier corresponding to the first uplink and correlating contact point information in the first registry message associated with the device identifier for the network device and uplink identifier for the first uplink.

Method 800 includes deciding (810) whether or not the determined contact point information associated with the first uplink of the network device (i.e., from the registry request message) is different from contact point information corresponding to the first uplink of the network device, stored in the contact point registry of the contact point network entity. In some implementations, the contact point registry does not contain any contact point information corresponding to the first uplink of the network device, and as such, the determined contact point information is considered to be different. In accordance with a determination that the contact point information associated with the first uplink of the network device in the registry request message is not different, the contact point network entity does not update (812) the contact point registry. In accordance with a determination that the contact point information associated with the first uplink of the network device in the registry request message is different, the contact point network entity updates (814) the contact point registry.

As described earlier with respect to method 700, the contact point network entity generates (816) a response message including the peer contact point information for the peer device uplinks of the peer devices of the first network device. Method 800 also includes conveying (818) the response message to the network device. As described in detail earlier, in some implementations this includes either transmission of the response message by the contact point network entity, or retrieval by the network device.

In some implementations, method 800 additionally includes obtaining a second registry request message from a second network device, in a similar manner to obtaining the registry request message from the network device. In some implementations, the second registry request message is obtained earlier or at the same time as the above described registry request message. In some embodiments, the contact point network entity obtains peer contact point information corresponding to one or more peer device uplinks of peer devices of the second device, and generates a second response message including the peer contact point information requested by the second device and conveys the second response message to the second network device.

Figure 9:
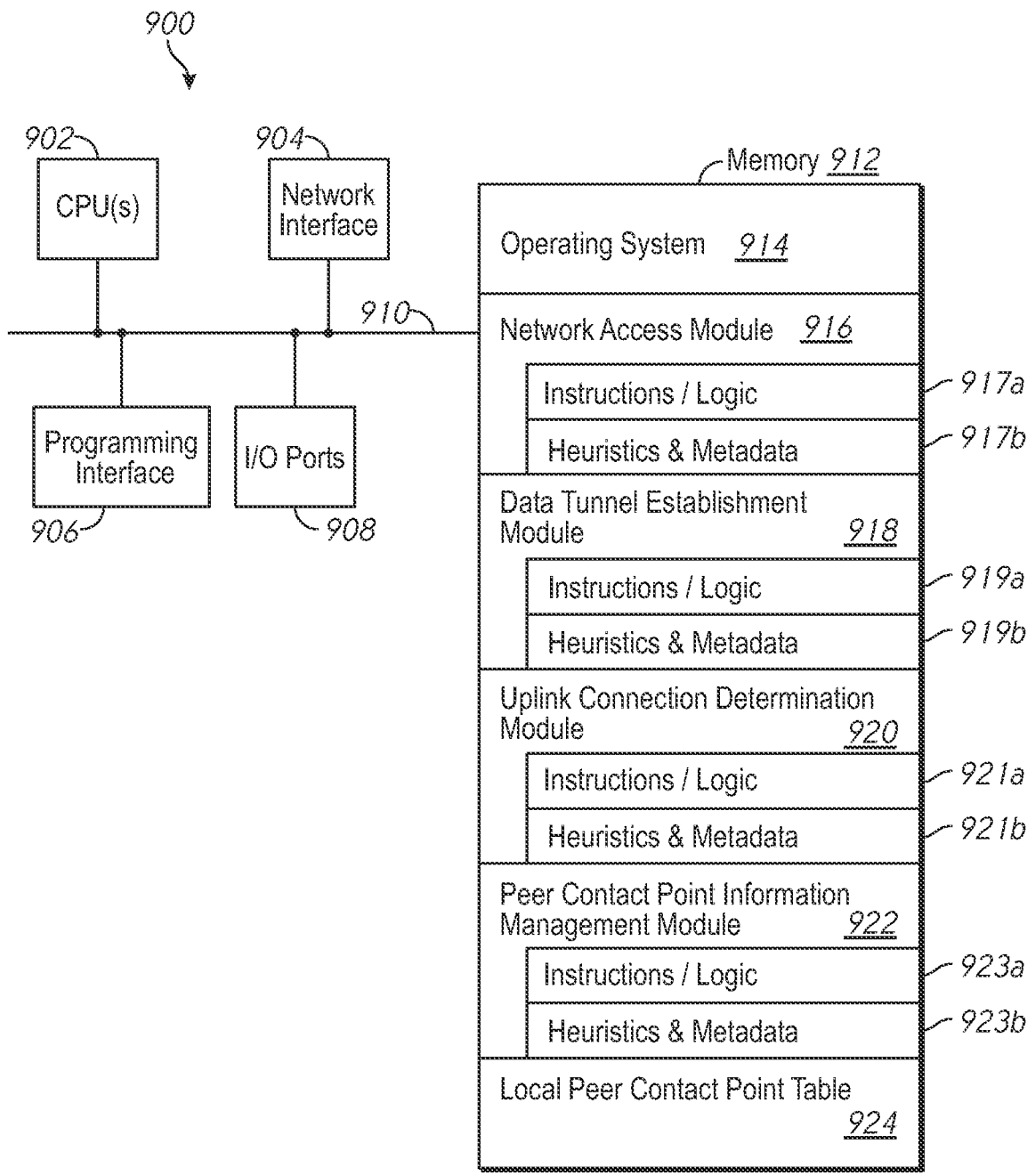
FIG. 9 is a block diagram of an example multi-uplink network device of a networking environment in accordance with some implementations.

FIG. 9 is a block diagram of an example network device 900 of a networking environment in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network device 900 includes one or more processing units (CPU's) 902, a network interface 904, a programming interface 906, one or more I/O ports 908, a memory 912, and one or more communication buses 910 for interconnecting these and various other components.

In some implementations, the communication buses 910 include circuitry that interconnects and controls communications between system components. The memory 912 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 912 optionally includes one or more storage devices remotely located from the CPU(s) 902. The memory 912 comprises a non-transitory computer readable storage medium. In some implementations, the memory 912 or the non-transitory computer readable storage medium of the memory 912 stores the following programs, modules and data structures, or a subset thereof including an optional operating system 914, a network access module 916, a data tunnel establishment module 918, an uplink connection determination module 920, a peer contact point information management module 922 and local peer contact point table 924.

The operating system 914 includes procedures for handling various basic system services and for performing hardware dependent tasks. In some implementations, network access module 916 is configured to allow the network device 900 to transmit and receive communications (e.g., to transmit registry request messages and/or receive response messages). To that end, in various implementations, the network access module 916 includes instructions and/or logic 917a, heuristics and metadata 917b.

In some implementations, data tunnel establishment module 918 is configured to establish private network tunnels (e.g., VPN data tunnels) between single or multi-uplink network devices. In some implementations this includes being configured to follow any tunnel-establishment policies. The data tunnel establishment module 918 is also configured, in some implementations, to generate one or more packets to send to a peer network device during the process of establishing a data tunnel. To that end, in various implementations, the data tunnel establishment module 918 includes instructions and/or logic 919a, heuristics and metadata 919b.

In some implementations, uplink connection determination module 920 is configured to determine a connection type associated with a peer device uplink. For example, uplink connection determination module 920 retrieves uplink connection type information from local peer contact point table 924. To that end, in various implementations, the uplink connection determination module 920 includes instructions and/or logic 921a, heuristics and metadata 921b.

In some implementations, peer contact point information management module 922 is configured to perform various management operations on local peer contact point table 924, and to obtain peer contact point information. For example, peer contact point information management module 922 stores, updates, retrieves and backs up information in local peer contact point table 924. In some implementations this includes being configured to obtain contact point information used by the data tunnel establishment module 918 to connect with uplinks of peer devices. To that end, in various implementations, the peer contact point information management module 922 includes instructions and/or logic 923a, heuristics and metadata 923b.

In some implementations, local peer contact point table 924 stores contact point information for one or more peer network devices of network device 900, such as network devices with a direct communication path or data tunnel to network device 900. In some implementations, local peer contact point table 924 also stores the contact point information corresponding to one or more uplinks of network device 900. In some implementations, local peer contact point table 924 stores additional information pertaining to network device 900 and/or one or more of its peer devices, such as online status, hub/spoke/mesh topology configuration and corresponding LAN information.

Figure 10:
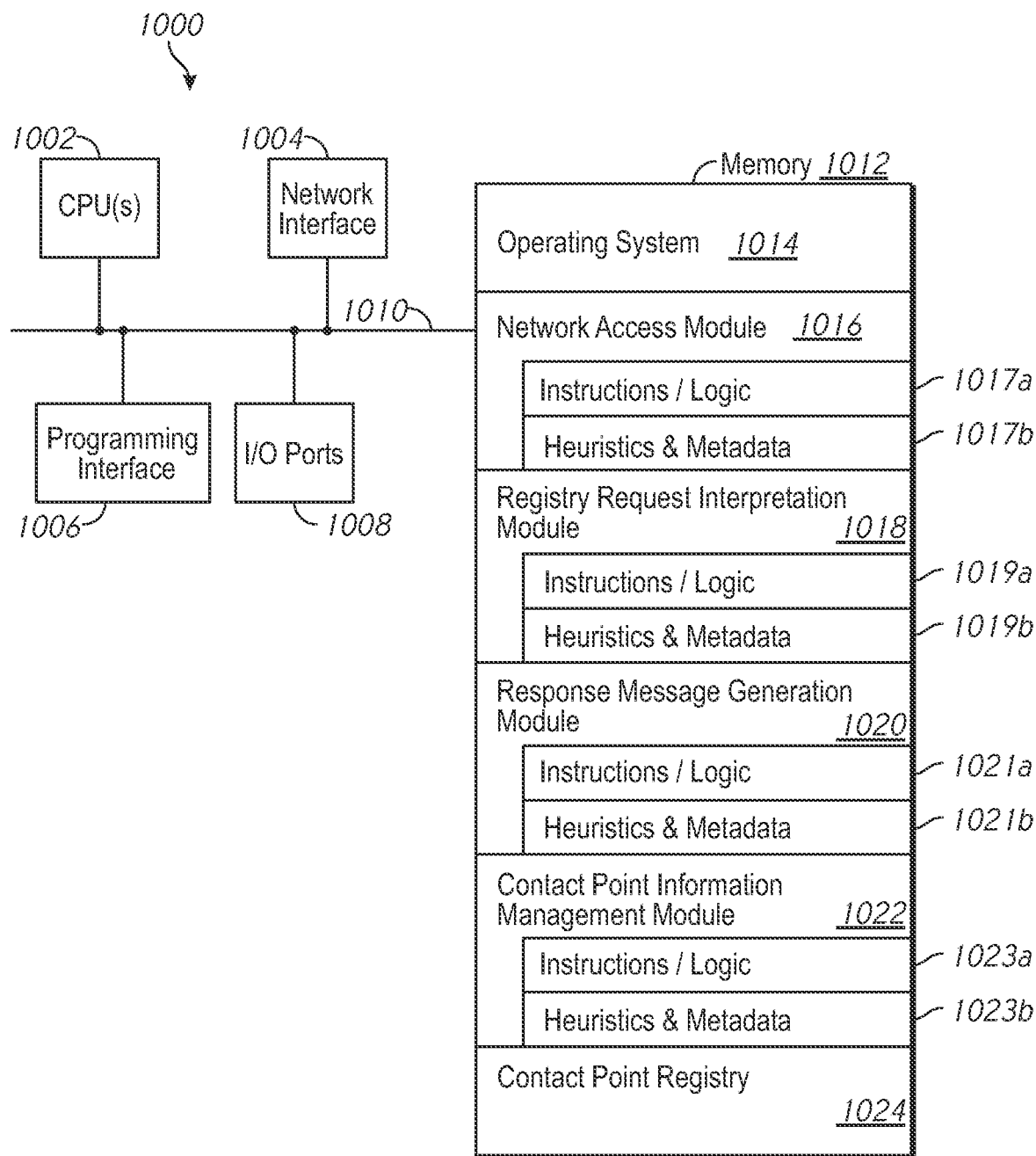
FIG. 10 is a block diagram of an example contact point network entity of a networking environment in accordance with some implementations.

FIG. 10 is a block diagram of an example contact point network entity 1000 of a networking environment in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the contact point network entity 1000 includes one or more processing units (CPU's) 1002, a network interface 1004, a programming interface 1006, one or more I/O ports 1008, a memory 1012, and one or more communication buses 1010 for interconnecting these and various other components.

In some implementations, the communication buses 1010 include circuitry that interconnects and controls communications between system components. The memory 1012 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1012 optionally includes one or more storage devices remotely located from the CPU(s) 1002. The memory 1012 comprises a non-transitory computer readable storage medium. In some implementations, the memory 1012 or the non-transitory computer readable storage medium of the memory 1012 stores the following programs, modules and data structures, or a subset thereof including an optional operating system 1014, a network access module 1016, an uplink-specific registry request interpretation module 1018, an uplink-specific response message generation module 1020, a contact point information management module 1022 and a contact point registry 1024.

The operating system 1014 includes procedures for handling various basic system services and for performing hardware dependent tasks. In some implementations, network access module 1016 is configured to allow the contact point network entity 1000 to transmit and receive communications (e.g., to receive uplink-specific registry request messages and/or transmit uplink-specific response messages). To that end, in various implementations, the network access module 1016 includes instructions and/or logic 1017a, heuristics and metadata 1017b.

In some implementations, uplink-specific registry request interpretation module 1018 is configured to interpret a received uplink-specific registry request message from a network device, and to determine the relevant information from the registry request message. For example, uplink-specific registry request interpretation module 1018 reads a received uplink-specific registry request message, identifies one or more peer device identifiers and/or one or more peer uplink identifiers, and any requests for contact point information corresponding to the one or more peer device identifiers and/or peer uplink identifiers. In another example, uplink-specific registry request interpretation module 1018 reads a received uplink-specific registry request message and determines uplink-specific contact point information corresponding to the uplink of a network device associated with the received registry request message (e.g., an uplink identifier, public IP address, and private IP address). To that end, in various implementations, the uplink-specific registry request interpretation module 1018 includes instructions and/or logic 1019a, heuristics and metadata 1019b.

In some implementations, uplink-specific response message generation module 1020 is configured to generate an uplink-specific response message. In some implementations this includes configuring the uplink-specific response message generation module 1020 to retrieve from contact point registry 1024, contact point information of the identified peer devices and their respective uplinks (e.g., from an uplink-specific registry request message) and writing the information to the uplink-specific response message. To that end, in various implementations, the response message generation module 1020 includes instructions and/or logic 1021a, heuristics and metadata 1021b.

In some implementations, contact point information management module 1022 is configured to perform various management operations on contact point registry 1024. For example, contact point information management module 1022 stores, updates, retrieves and backs up information in contact point registry 1024. To that end, in various implementations, the contact point information management module 1020 includes instructions and/or logic 1023a, heuristics and metadata 1023b.

While various aspects of implementations within the scope of the appended claims are described above, those of ordinary skill in the art will appreciate from the present disclosure that in some embodiments, the various features of implementations described above are embodied in a wide variety of forms and that any specific structure and/or function described above is merely illustrative. Based on the present disclosure one skilled in the art will appreciate that in some embodiments, an aspect described herein is implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, those of ordinary skill in the art will appreciate from the present disclosure that these elements will not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a first network device corresponding to a first network site, including a memory, a non-transitory computer readable storage medium, one or more processors and two or more communication ports:
communicating with one or more remote hosts to obtain, at the first network device, contact point information for a second network site, the second network site comprising one or more other network devices associated with the first network device as peer devices in a private network, wherein the contact point information for the second network site includes one or more peer uplink identifiers, each respective peer uplink identifier corresponding to a respective peer device uplink of a corresponding one of the one or more other network devices;

establishing a first private network data tunnel from a first uplink of the first network device to the second network site, based on the contact point information including a first uplink identifier associated with a first peer device uplink, the first uplink of the first network device being associated with a first set of source and destination ports connected to one or more first networks;

establishing a second private network data tunnel from a second uplink of the first network device to the second network site, based on the contact point information including a second uplink identifier associated with a second peer device uplink, wherein the first and second private network data tunnels are concurrently active for sending data, the second uplink of the first network device being associated with a second set of source and destination ports connected to one or more second networks, wherein the first private network data tunnel is associated with a first link type and the second private network data tunnel is associated with a second link type, wherein the first link type is at least one of a public network connection, an Internet link, or an internet service provider connection, and wherein the second link type is a multiprotocol label switching (MPLS) link; and selectively routing data from the first network device to the second network site across the first private network data tunnel and the second private network data tunnel.

2. The method of claim 1, wherein the contact point information provided to the first network device depends on a role associated with the first network device in a network topology including the first and second network sites.

3. The method of claim 2, wherein the role is a spoke device.

4. The method of claim 3, wherein the one or more other network devices of the second network site are hub devices.

5. The method of claim 1, wherein selectively routing the data includes:
   routing a first portion of the data that satisfies a selection criterion via the first private network data tunnel; and
   routing a second portion of the data that does not satisfy the selection criterion via the second private network data tunnel based on a routing criterion.

6. The method of claim 1, wherein selectively routing the data comprises:
   selectively routing data from the first network device to the second network site across the first private network data tunnel and the second private network data tunnel to isolate sensitive data on the first private network data tunnel.

7. The method of claim 1, wherein selectively routing the data is based on one or more bandwidth parameters corresponding to high priority network traffic.

8. The method of claim 1, wherein selectively routing the data is based on a prioritization of network traffic.

9. A first network device comprising:
   a memory, one or more processors and two or more communication ports, wherein the memory is coupled to the one or more processors, the memory storing instructions which when executed by the one or more processors causes the first network device to:
   communicate with one or more remote hosts to obtain, at the first network device, contact point information for a second network site, the second network site comprising one or more other network devices associated with the first network device as peer devices in a private network, wherein the contact point information for the second network site includes one or more peer uplink identifiers, each respective peer uplink identifier corresponding to a respective peer device uplink of a corresponding one of the one or more other network devices;

establish a first private network data tunnel from a first uplink of the first network device to the second network site, based on the contact point information including a first uplink identifier associated with a first peer device uplink, the first uplink of the first network device being associated with a first set of source and destination ports connected to one or more first networks;

establish a second private network data tunnel from a second uplink of the first network device to the second network site, based on the contact point information including a second uplink identifier associated with a second peer device uplink, wherein the first and second private network data tunnels are concurrently active for sending data, the second uplink of the first network device being associated with a second set of source and destination ports connected to one or more second networks, wherein the first private network data tunnel is associated with a first link type and the second private network data tunnel is associated with a second link type, wherein the first link type is at least one of a public network connection, an Internet link, or an internet service provider connection, and wherein the second link type is a multiprotocol label switching (MPLS) link; and selectively route data from the first network device to the second network site across the first private network data tunnel and the second private network data tunnel.

10. The first network device of claim 9, wherein the contact point information provided to the first network device depends on a role associated with the first network device in a network topology including the first and second network sites.

11. The first network device of claim 10, wherein the role is a spoke device.

12. The first network device of claim 11, wherein the one or more other network devices of the second network site are hub devices.

13. The first network device of claim 9, wherein selectively routing the data includes:
   routing a first portion of the data that satisfies a selection criterion via the first private network data tunnel; and
   routing a second portion of the data that does not satisfy the selection criterion via the second private network data tunnel based on a routing criterion.

14. The first network device of claim 9, wherein selectively routing the data comprises:
   selectively routing data from the first network device to the second network site across the first private network data tunnel and the second private network data tunnel to isolate sensitive data on the first private network data tunnel.

15. The first network device of claim 9, wherein selectively routing the data is based on one or more bandwidth parameters corresponding to high priority network traffic.

16. The first network device of claim 9, wherein selectively routing the data is based on a prioritization of network traffic.

17. A method comprising:
at a network management device associated with a private network, the network management device including a memory, a non-transitory computer readable storage medium, one or more processors and two or more communication ports:
maintaining contact point information for a plurality of network devices of the private network, wherein the contact point information for at least a first network device of the plurality of network devices comprises a first uplink identifier corresponding to a first device uplink of the first network device and a second uplink identifier corresponding to a second device uplink of the first network device;
maintaining private network topology information comprising associations between the plurality of network devices as peer devices;
communicating with a second network device of the plurality of network devices to provide configuration information for the second network device, wherein the second network device comprises a third device uplink and a fourth device uplink, wherein the third device uplink of the second network device is associated with a first set of source and destination ports connected to one or more first networks via a first link type, and wherein the fourth device uplink of the second network device is associated with a second set of source and destination ports connected to one or more second networks via a second link type, wherein the first link type is at least one of a public network connection, an Internet link, or an internet service provider connection, and wherein the second link type is a multiprotocol label switching (MPLS) link; and
providing the configuration information to the second network device, wherein the configuration information comprises the contact point information for corresponding ones of the plurality of network devices that are associated with the second network device based on the private network topology information, the configuration information comprising the contact point information of at least the first network device.

18. The method of claim 17, further comprising monitoring a status of the plurality of network devices.

19. The method of claim 18, wherein monitoring the status of the plurality of network devices comprises receiving one or more messages from each of the plurality of network devices on a periodic basis.

20. The method of claim 19, wherein the one or more messages, for at least one of the plurality of network devices, are transmitted on each available uplink of the least one of the plurality of network devices.

21. The method of claim 19, further comprising updating one or more of the plurality of network devices with status information corresponding to peers of the plurality of network devices.

22. The method of claim 17, wherein the network management device is a cloud-hosted system.

23. The method of claim 22, wherein the network management device is further operative to manage the configuration of the plurality of network devices.

24. A network management device associated with a private network, the network management device comprising a memory, one or more processors and one or more communication ports, wherein the memory is coupled to the one or more processors, the memory storing instructions which when executed by the one or more processors causes the network management device to:
maintain contact point information for a plurality of network devices of a private network, wherein the contact point information for at least a first network device of the plurality of network devices comprises a first uplink identifier corresponding to a first device uplink of the first network device and a second uplink identifier corresponding to a second device uplink of the first network device;
maintain private network topology information comprising associations between the plurality of network devices as peer devices;
communicate with a second network device of the plurality of network devices to provide configuration information for the second network device, wherein the second network device comprises a third device uplink and a fourth device uplink, wherein the third device uplink of the second network device is associated with a first set of source and destination ports connected to one or more first networks via a first link type, and wherein the fourth device uplink of the second network device is associated with a second set of source and destination ports connected to one or more second networks via a second link type, wherein the first link type is at least one of a public network connection, an Internet link, or an internet service provider connection, and wherein the second link type is a multiprotocol label switching (MPLS) link; and
provide the configuration information to the second network device, wherein the configuration information comprises the contact point information for corresponding ones of the plurality of network devices that are associated with the second network device based on the private network topology information, the configuration information comprising the contact point information of at least the first network device.

25. The network management device of claim 24, wherein the instructions which when executed by the one or more processors causes the network management device to monitor status of the plurality of network devices.

26. The network management device of claim 25, wherein monitoring the status of the plurality of network devices comprises receiving one or more messages from each of the plurality of network devices on a periodic basis.

27. The network management device of claim 26, wherein the one or more messages, for at least one of the plurality of network devices, are transmitted on each available uplink of the least one of the plurality of network devices.

28. The network management device of claim 26, wherein the instructions which when executed by the one or more processors causes the network management device to update one or more of the plurality of network devices with status information corresponding to peers of the plurality of network devices.

29. The network management device of claim 24, wherein the network management device is a cloud-hosted system.

30. The network management device of claim 29, wherein the instructions which when executed by the one or more processors causes the network management device to manage the configuration of the plurality of network devices.

* * * * *